United States Patent [19]

Graham

[11] 4,002,599
[45] Jan. 11, 1977

[54] EPOXY RESIN COMPOSITIONS FROM GLYCIDYL DERIVATIVES OF AMINOPHENOLS CURED WITH TETRACARBOXYLIC DIANHYDRIDES

[75] Inventor: James A. Graham, Erie, Pa.
[73] Assignee: Lord Corporation, Erie, Pa.
[22] Filed: Nov. 6, 1975
[21] Appl. No.: 629,342
[52] U.S. Cl. .................. 260/47 EA; 260/830 TW; 260/831; 260/836
[51] Int. Cl.² ................ C08G 59/32; C08G 59/42
[58] Field of Search ............... 260/47 EA, 830 TW

[56] References Cited
UNITED STATES PATENTS

| 2,951,825 | 9/1960 | Reinking | 260/47 |
| 3,324,081 | 6/1967 | Barie et al. | 260/47 |
| 3,502,609 | 3/1970 | Barie et al. | 260/37 |

Primary Examiner—Harold D. Anderson
Assistant Examiner—Earl A. Nielsen
Attorney, Agent, or Firm—John A. Gazewood

[57] ABSTRACT

Disclosed are epoxy resin compositions comprising at least one polyglycidyl derivative of an aminophenol having the structure

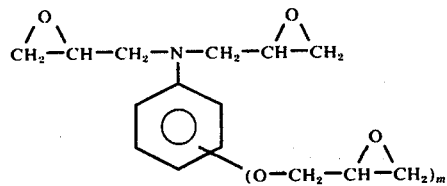

and at least one biphenyl anhydride having the structure

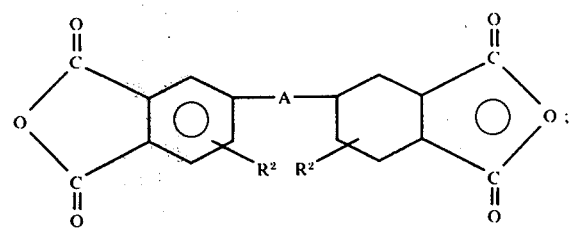

wherein $m$ is 1 or 2; wherein A is selected from the group consisting of

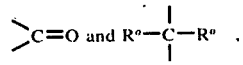

wherein each $R''$ is individually a monovalent radical selected from the group consisting of hydrogen, halogen, hydroxy, alkyl radical having from 1 to 5 carbon atoms, alkoxy radical having from 1 to 5 carbon atoms and

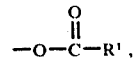

wherein $R^1$ is an alkyl radical having from 1 to 5 carbon atoms; and wherein each $R^2$ is individually a monovalent radical selected from the group consisting of hydrogen, halogen, alkyl radical having from 1 to 5 carbon atoms, $-NO_2$, $-COOH$, $-SO_3H$, and $-NH_2$. The compositions are useful in such applications as molding resins, laminates, adhesives, coatings, and the like. The disclosed epoxy resin-anhydride systems can be cured at ambient temperatures to afford products having useful properties at high temperature.

40 Claims, No Drawings

EPOXY RESIN COMPOSITIONS FROM GLYCIDYL DERIVATIVES OF AMINOPHENOLS CURED WITH TETRACARBOXYLIC DIANHYDRIDES

This invention relates to epoxy resin compositions. More particularly, the invention relates to epoxy resin compositions which are curable at ambient temperatures to afford products having useful properties at high temperature.

Epoxy resins are among the most versatile of the plastic materials. Because of their toughness, adhesion, chemical resistance and electrical properties, the combination of which is not found in any other single organic polymeric material, the epoxy resins are widely used in coating, adhesive, casting, molding, laminating, potting and encapsulation, and reinforced plastic applications. In general, the epoxy resin is not used by itself but requires the addition of a curing agent or hardener to convert the resin to a crosslinked material. Curing agents which are commonly employed with epoxy resins include aliphatic and aromatic amines, polyamides, tertiary amines, amine adducts, acids, acid monoanhydrides, acid dianhydrides, aldehyde condensation products, and Lewis acid type catalysts. Selection of an appropriate curing agent depends upon system requirements such as mixture viscosity, system mass and temperature, and the characteristics desired in the cured resin such as resistance to temperature and chemicals, electrical properties, and the like.

In recent years, there has been an increasing demand from the aerospace industry and other industrial applications for materials having high-temperature utility. High-temperature utility can be improved through the use of anhydride and certain amine curing agents at elevated curing cycles, as well as through the use of epoxy resins obtained by the epoxidation, with peroxy compounds, of double bonds in certain Diels-Alder adducts. However in many applications the high temperature utility is insufficient. Studies indicate that temperature resistance, as well as chemical and heat resistance, is a function of crosslink density of the cured resin, with higher crosslink density affording improvements in these properties. Higher crosslink density can be achieved by increasing the functionality of either the epoxy resin or the hardening agent. Thus there is a continuing search for new epoxy resins and hardening agents which can afford improvements in the properties of the cured materials.

Organic acid dianhydrides which contain either cyclic or aromatic structures and have high functionality have been found to impart improved heat resistance, as well as increased chemical and solvent resistance, to cured epoxy resin compositions. Among such acid dianhydrides which have been found to be effective in improving these properties of the cured epoxy resin are pyromellitic dianhydride, cyclopentadiene dianhydride, and benzophenone tetracarboxylic dianhydrides. The organic acid dianhydrides, while effective in imparting improved properties to cured epoxy resin compositions, particularly with respect to high temperature resistance, suffer from the drawback that they are generally high-melting solids which are not soluble to any appreciable extent in common solvents nor epoxy resins, except at elevated temperatures where reaction occurs causing premature gellation of the resin systems. This relative insolubility of the organic acid dianhydrides requires special handling procedures, such as high shear mixing, to incorporate them into the epoxy resin so that homogeneous compositions can be prepared.

The use of the organic acid dianhydrides as curing agents for epoxy resins is not without other problems. For example, Barie and Frank, I & EC, Prod. Res. & Dev., Vol. 8, page 72, March 1969, "High Temperature Epoxy Resins Based on 3,3',4,4'-Benzephenone Tetracarboxylic Diahydride (BTDA), " describe uncatalyzed 3,3'4,4'-benzophenone tetracarboxylic dianhydride-hardened epoxy resin pastes, with anhydride to epoxy equivalent rations between 0.6 and 0.9 and a curing temperature of 200° C, for use as a metal adhesive, which can also contain filler particles. They also describe uncatalyzed, BTDA-maleic anhydride-epoxy resin casting compositions, with anhydride to epoxy equivalent ratios between 0.5 and 0.95, mixing temperatures of 150° C and a pot life of 5 to 10 minutes. These compositions have a curing temperature of about 200° to 220° C, and flexural strength values (ASTM D-790), after a 24-hour 200° C cure, of 13,200 psi after 5 weeks (A/E ratio 0.85). The BTDA-maleic anhydride is added to hot epoxy resin with stirring for 10 minutes until the BTDA goes into solution. These compositions have been suggested for use in high temperature laminates, but the high press temperatures necessary to cure, and the very poor pot life and/or prepreg shelf life would make the system commercially unfeasible. U.S. Pat. No. 3,794,555 discloses BTDA-NADIC methyl anhydride-epoxy resin solutions which are admixed at temperatures over 100° C to provide moderate BTDA inclusion.

High temperature curing cycles can be avoided through the use of the known ambient temperature-active epoxy resin curing agents such as diethylene triamine, low molecular weight polyamideamines, and the like. Such curing agents afford cured resin systems having excellent ambient temperature properties but, unfortunately, almost without exception, little, if any, utility at high temperatures.

There remains a need for epoxy resin-curing agent compositions which can be cured at low temperatures to afford cured resin systems having good high temperature resistance, as well as improved chemical and solvent resistance. In addition, the curing agent should be readily incorporated into the epoxy resin at low temperatures to afford epoxy resin compositions having an extended work life.

In accordance with the present invention, it has been discovered that biphenyl anhydride epoxy curing agents are solubilized at room temperature in polyglycidyl derivatives of aminophenols to afford epoxy resin compositions curable at room to provide cured epoxy systems characterized by high temperature resistance, solvent resistance, and chemical resistance. This discovery was particularly surprising since the prior art has regarded solid anhydride curing agents to be substantially insoluble in epoxy resins. Further demonstrative of the uniqueness of the invention is the room temperature cure capability, since the prior art anhydride-cured epoxy resins have generally required temperatures in excess of 100° C and the biphenyl anhydride-cured epoxy resin systems themselves require uncatalyzed curing temperatures in the range of 200° C.

More particularly, it has been discovered that biphenyl anhydrides having the structure

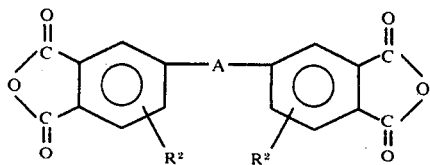

wherein A is selected from the group consisting of

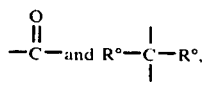

wherein each $R^0$ is individually a monovalent radical selected from the group consisting of hydrogen, halogen, hydroxy, alkyl radical having from 1 to 5 carbon atoms, and

wherein R is an alkyl radical having from 1 to 5 carbon atoms, and wherein each $R^2$ is individually a monovalent radical selected from the group consisting of hydrogen, halogen, alkyl radical having from 1 to 5 carbon atoms, $-NO_2$, $-COOH$, $-SO_3H$, and $-NH_2$; can be solubilized in polyglycidyl derivatives of aminophenols having the formula

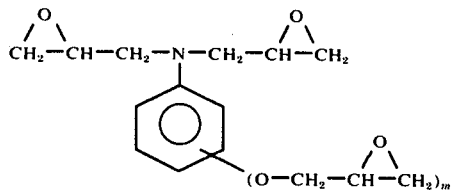

wherein m is 1 to 2, at room temperature to afford liquid epoxy resinanhydride resin systems curable at room temperature. Benzophenone tetracarboxylic dianhydrides, i.e.,

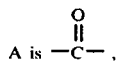

are preferred biphenyl anhydride compounds, with 3,3′, 4,4′-benzophenone tetracarboxylic dianhydride

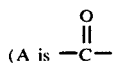

and each $R^2$ is hydrogen) being especially preferred. The preferred polyglycidyl derivative of aminophenol at the present time is triglycidyl p-aminophenol (m is 1).

The biphenyl anhydrides which are employed in the practice of the present invention are normally solid compounds having melting points in the range of 200° C and higher. These anhydrides are known curing agents for epoxy resins and can be prepared according to the disclosures of McCracken et al U.S. Pat. No. 3,078,279 and Barie et al U.S. Pat. No. 3,324,081. Prior to the instant invention, the prior art considered biphenyl anhydrides to be substantially insoluble in epoxy resins and common solvent systems.

Similarly, the polyglycidyl derivatives of aminophenols which are employed in forming the novel compositions of the present invention are normally fluid, viscous materials which are commercially available. Such polyglycidyl aminophenols can be prepared according to the disclosure of Reinking et al U.S. Pat. No. 2,951,825.

The biphenyl anhydride/polyglycidyl aminophenol base epoxy resin compositions of this invention can be used in adhesive, casting, molding, potting and encapsulation, coating, laminating, reinforced plastic, and the like applications to afford ultimate products having useful high temperature properties. The base epoxy resin compositions can also be used to modify, or can be modified by other epoxy resin systems; and other liquid and/or solid anhydrides can be employed as co-curing agents. The base epoxy resin compositions can be modified also by the incorporation of other resinous film forming materials such as polybutadiene, hydroxy- and carboxy-functional polybutadiene, polyamides, and the like to improve flexibility, impact resistance, etc. There may be incorporated into the compositions of the invention, whether or not modified, those additives conventionally employed with epoxy resin compositions including, without limitation thereto, solvents, fillers, particularly metal and conductive metallic fillers, plasticizers, flexibilizers, reinforcing fibers, carboxylic acids, inorganic acids, free radical sources, coupling agents such as polyfunctional organosilanes and the like, antioxidants, catalysts, and the like.

The other epoxy resins which can be combined with the base epoxy resin compositions of the invention can be broadly described as organic materials having a plurality of reactive 1,2-epoxy groups. Such epoxy materials can be monomeric or polymeric, saturated or unsaturated, aliphatic, cycloaliphatic, aromatic or heterocyclic, and they may be substituted if desired with substituents other than epoxy groups, such as hydroxyl groups, ether radicals, halogen atoms, and the like. Representative epoxy materials include, without limitation thereto, epoxy polyethers obtained by reacting an epihalohydrin with a polyhydric phenol or a polyhydric alcohol; polyepoxy-polyhydroxypolyethers obtained by reating a polyepoxide with a polyhydric phenol or a polyhydric alcohol; epoxy novolaks; and the like. Further details of epoxy co-reactants which can be employed according to the present invention can be found in U.S. Pat. Nos. 2,633,548; 2,872,427; 2,884,408; and 3,759,914, among others.

Anhydrides which can be employed as co-curing agents in accordance with the practice of this invention including, without limitation thereto, maleic anhydride, succinic anhydride, phthalic anhydride, tetrahydrophthalic anhydride, NADIC methyl anhydride, pyromellitic dianhydride, and the like.

In forming the compositions of the present invention, the anhydride and epoxy resin components will be used in amounts sufficient to provide an effective weight ratio A/E of anhydride: epoxy resin in the range of about 1.2–1.3:1, preferably about 0.55–1.1:1, and preferentially about 0.6–0.95:1. When mixed anhydride curing systems are employed, it is preferred that at least about 40 percent of the total anhydride equivalents be provided by the biphenyl anhydride component of the mixed anhydride curing systems. In like manner, when mixed epoxy resin systems are employed it has been found that at least 50 percent of the total epoxy equivalents must be provided by the polyglycidyl aminophenol component of such mixed epoxy resin compositions. Since solubilization of the biphenyl anhydride in the polyglycidyl aminophenol is a function of a number of variables, including particle size, amount of total anhydride and/or total epoxy resin, relative amounts of individual anhydride and/or individual epoxy resin, inter alia, some amount of routine experimentation may be required to obtain optimal compositions.

Because the epoxy resin systems of this invention are reactive at room temperature, mixing of the anhydride and the epoxy components will preferentially be accomplished at the job site. The reactive system is readily prepared by blending the anhydride curing system comprising biphenyl anhydride, in which any solid anhydride has a particle size below about 150 microns average diameter, into the epoxy resin system comprising liquid polyglycidyl aminophenol. In this regard, when mixed anhydride systems are employed, the individual anhydrides are preferably admixed prior to incorporation into the epoxy resin system, which itself can be a priorly admixed system comprising two or more epoxy resins, one of which resins is polyglydidyl aminophenol. When employing mixed epoxy resin systems, the anhydride component can optionally, but less preferentially be mixed into the other epoxy resin(s) prior to being blended into the polyglycidyl aminophenol epoxy resin. Simple mixing means such as by stirring, ball milling and the like, is effective to cause substantial solubilization of biphenyl anhydride in polyglycidyl aminophenol. Prior to admixing of the anhydride and epoxy components, it can be advantageous to subject –least the biphenyl anhydride to high shear forces, such as a three-roll mill, to reduce the average particle size, to enhance solubilization of biphenyl anhydride particles. While mixing is preferably accomplished at room temperature, gentle heating of the anhydride/epoxy blend to temperatures below about 50° C can be employed to abet solubilization, particularly at higher anhydride: epoxy ratios and when using mixed anhydride and/or mixed epoxy resin systems, without causing significant premature gellation of the blend. The blending of the anhydride and epoxy resin results in a mild, rapid endotherm on the order of 7°—12° C, followed by a gradual return to ambient temperature.

Because the epoxy resin compositions of the present invention are curable at room temperature, the compositions of this invention are preferably provided as a two-part system, one part comprising biphenyl anhydride and other curing agents when employed, together with conventional additives which are not reactive with the curing agents; and the other part comprising polyglycidyl derivative of aminophenol and other epoxy resins when employed, together with conventional additives which are not reactive with the epoxy resins. The individual parts are admixed at the job site and application is accomplished using the same techniques and equipment generally utilized with epoxy resin compositions. Even though curable at room temperatures, the compositions of this invention nevertheless remain workable for periods in excess of 8 hours before crosslinking has advanced to a degree sufficient to inhibit continued use of the blended compositions. Curing of the compositions is effected at room temperature. Surprisingly, the room temperature cure exhibits no substantial exotherm. At times, curing at elevated temperatures below about 150° C can be beneficial with respect to ultimate properties and setting times, depending upon the application. Curing at temperatures above 150° C does not appear to provide any appreciable improvement in cured resin properties. It should be noted that elevated cure temperatures is accompanied by an exotherm which increases with temperature. It has also been found that the room temperature cure rate can be accelerated by adding an effective amount (generally less than about 5 percent) of water or other hydroxy-containing materials to the herein described epoxy resin compositions.

The following examples are illustrative of the invention. In the examples, amounts are parts by weight, unless otherwise noted.

EXAMPLE I

Several epoxy resin/anhydride curing agent systems are prepared according to the following formulations:

| COMPOSITION | 1A | 1B | 1C |
|---|---|---|---|
| Ingredients: | | | |
| 3,3'4,4', - Benzophenone Tetracarboxylic Dianhydride | 24 | 20 | 60 |
| Maleic Anhydride | 36 | 40 | 0 |
| Epon 828[a] | 100 | 100 | 100 |
| Aluminum Powder | 100 | 100 | 100 |
| Fumed Amorophous Silica | 3 | 3 | 3 |

[a]=Bis-phenol A/Epichlorhydrin Epoxy Resin; Shell Chemical Corporation.

a = Bis-phenol A/Epichlorhydrin Epoxy Resin; Shell Chemical Corporation.

The individual anhydrides are sequentially blended into the liquid bisphenol A/epichlorhydrin epoxy resin and the admixture is homogenized using mechanical mixing means. The blending of Composition 1A is effected at 50° C, with blending of Compositions 1B and 1C being effected at room temperature. A homogeneous suspension is obtained, with substantially no solubilization of either anhydride in the epoxy resin being observed.

The individual compositions are employed to bond sand-blasted, solvent-degreased, etched aluminum parts. Substantially no cure is obtained at room temperature after 24 hours; the compositions showing no significant change. Certain of the bonded assemblies are cured at 200° C for 2 hours, cooled to room temperature, and tested for tensile lap shear (TLS) in accordance with the procedure of ASTM D-1002-64 at room temperature (RT), 300° F, and 500° F. The results are reported in Table I.

TABLE I

| | Tensile Lap Shear, psi Test Temperature | | |
|---|---|---|---|
| COMPOSITION | RT | 300° F | 500° F |
| 1A | 2348 | 898 | 173 |
| 2A | 1681 | 933 | 52 |
| 3A | 2055 | 1476 | 759 |

The data demonstrate the substantial insolubility of biphenyl anhydride curing agents in conventional epoxy resin systems and the need for elevated temperature curing cycles generally required for anhydride epoxy curing systems.

EXAMPLE II

To 100 parts triglycidyl p-aminophenol epoxy resin there is added by mechanical mixing means at room temperature 96 parts 3,3',4,4'-benzophenone tetracarboxylic dianhydride. Solubilization is noted with an immediate endotherm followed by a gradual rise to room temperature. It is noted that a small amount of large particle size dianhydride remain suspended in the solution. The solution is heated at 50° C to complete solubilization of the dianhydride. The composition is employed to adhesively bond sand-blasted, solvent-degreased, etched aluminum parts. The bonded assemblies are cured at room temperature for 24 hours and tested for tensile lap shear (ASTM D-1002-64) at room temperature (RT) and 300° F. Results are reported in Table II.

TABLE II

| Test Temperature | Tensile Lap Shear, psi |
|---|---|
| Room Temperature | 343 |
| 300° F | 1213 |

The data demonstrates the unexpected solubility of biphenyl anhydrides in glycidyl aminophenol epoxy resins and the also unexpected room temperature cure capability, of the data of Example I, wherein biphenyl anhydride is substantially insoluble in bis-phenol A) epichlorhydrin epoxy resin and room temperature cure was not obtained.

EXAMPLE III

To 100 parts triglycidyl p-aminophenol epoxy resin there is added a mixture comprising 28 parts 3,3',4,4'-benzophenone tetracarboxylic dianhydride, 42 parts maleic anhydride, 100 parts titanium dioxide and 14 parts fumed amorphous silica. Mixing is accomplished by mechanical mixing means at 50° C. The mixed anhydride epoxy curing agent system is substantially completely dissolved in the epoxy resin. The composition is employed to bond sand-blasted, solvent-degreased, etched aluminum parts. The bonded assemblies are cured at room temperature for 24 hours and tested for tensile lap shear (ASTM D-1002-64) at room temperature (RT) and 300° F. Results are reported in Table III.

Table III

| Test Temperature | Tensile Lap Shear, psi |
|---|---|
| Room Temperature | 345 |
| 300° F | 2305 |

The data demonstrate stable two-package epoxy resin/anhydride curing agent systems which are curable at room temperature to afford cured products having high temperature resistance, and mixed anhydride curing systems effective to cure epoxy resins at room temperature.

EXAMPLE IV by mechanical mixing means there is sequentially blended 28 parts 3,3',4,4'-benzophenone tetracarboxylic dianhydride and 42 parts maleic anhydride into 30 parts Epon 828 bis-phenol A/epichlorhydrin epoxy resin to obtain a stable dispersion of anhydride in epoxy resin. Substantially no solubilization of anhydride is noted. The dispersion is labeled Part A. There is blended by mechanical mixing means into 70 parts triglycidyl p-aminophenol, 100 parts titanium dioxide and 14 parts fumed amorphous silica to obtain a stable dispersion, labeled Part B. Part A is blended into Part B by mechanical mixing means with substantial solubilization of the anhydride being noted. The composition is employed to adhesively bond sand-blasted, solvent-degreased, etched aluminum parts. After curing for 24 hours at room temperature, the bonded assemblies are tested for tensile lap shear (ASTM D-1002-64) at room temperature (RT) and 300° F. The results are reported in Table IV.

TABLE IV

| Test Temperature | Tensile Lap Shear, psi |
|---|---|
| Room Temperature | 1073 |
| 300° F | 1958 |

The data demonstrate the solubility of biphenyl anhydrides in glycidyl aminophenol epoxy resins; and the room temperature cure capability of biphenyl anhydride/glycidyl aminophenol epoxy resin systems to afford cured resin systems having high temperature resistance. The data demonstrate that stable two-package anhydride curing agent/epoxy resin systems cureable at room temperature are easily obtained in accordance with the invention. The data further demonstrate mixed anhydride/mixed epoxy resin systems which can be cured at room temperature.

EXAMPLE V

Compositions were prepared according to the following schedule:

| COMPOSITION | A | B | C | D | E |
|---|---|---|---|---|---|
| Ingredients | | | | | |
| Triglycidyl p-aminophenol | 90 | 50 | 70 | 80 | — |
| Butyl glycidyl ether | 10 | — | — | — | — |
| Bis-phenol A/epichlorhydrin epoxy resin (Epon 828) | — | 50 | 30 | 20 | 100 |
| 3,3',4,4'-Benzophenone tetracarboxylic dianhydride | 96 | 73 | 83 | 87 | — |
| Diethylene tetramine | — | — | — | — | 10 |
| Fumed amorphous silica | 4 | 4 | 4 | 4 | 4 |

The compositions are prepared by blending the curing agents and other additives into the epoxy resin system. In each of compositions A-D, the biphenyl anhydride is soluble in the resin system. The amount of curing agent in each instance is sufficient to afford the equivalent of anhydride: epoxy ratio of 0.6:1. The compositions are employed to bond sand-blasted, solvent-degreased, etched aluminum parts. In each instance, the bonded assemblies are cured at room temperature for 24 hours and tested for tensile lap shear (ASTM D-1002-64) at room temperature (RT) and 300° F. Composition E is a control formulation comprising a conventional epoxy resin and a widely used room temperature curing agent. The results are reported in the following Table.

TABLE V

| COMPOSITION | Tensile Lap Shear, psi Test Temperature | |
|---|---|---|
| | RT | 300° F |
| A | 446 | 440 |
| B | 523 | 400 |

TABLE V-continued

| COMPOSITION | Tensile Lap Shear, psi Test Temperature | |
|---|---|---|
| | RT | 300° F |
| C | 422 | 393 |
| D | 413 | 319 |
| E | 428 | 173 |

The data demonstrate room temperature anhydride curing of modified epoxy resin systems to obtain cured systems having high temperature properties not attainable by standard room temperature curing agents.

EXAMPLE VI

Several compositions were prepared and tested according to the procedure of Example V. The formulations and tensile lap shear results are reported in Table VI.

TABLE VI

| COMPOSITION | A | B | C | D | E | F | G | H | I | J | K | L |
|---|---|---|---|---|---|---|---|---|---|---|---|---|
| Ingredients | | | | | | | | | | | | |
| 3,3',4,4'-Benzophenone tetracarboxylic dianhydride | 28 | 28 | 28 | 28 | 28 | 28 | 28 | 28 | 28 | 28 | 28 | 28 |
| Maleic anhydride | 42 | 42 | 42 | 42 | 42 | 42 | 42 | 42 | 42 | 42 | 42 | 42 |
| Triglycidyl p-aminophenol | 100 | 100 | 100 | 100 | 100 | 100 | 100 | 100 | 100 | 100 | 100 | 100 |
| Carboxy-terminated butadiene/acrylonitrile copolymer | — | 10 | 30 | — | — | — | — | — | — | — | — | — |
| Mercapto-terminated butadiene/acrylonitrile copolymer | — | — | — | 10 | 30 | — | — | — | — | — | — | — |
| Polyethylene | — | — | — | — | — | — | 10 | 30 | — | — | — | — |
| Glycidyl-capped polyurethane | — | — | — | — | — | — | — | — | 10 | 30 | — | — |
| Polyamide | — | — | — | — | — | — | — | — | — | — | 10 | 30 |
| Titanium Dioxide | 100 | 100 | 100 | 100 | 100 | — | — | — | — | — | — | — |
| Fumed Amorphous Silica | 4 | 4 | 4 | 4 | 4 | 4 | 4 | 4 | 4 | 4 | 4 | 4 |
| Tensile Lap Shear, psi | | | | | | | | | | | | |
| Room Temperature | 733 | 308 | 102 | 729 | 1010 | 507 | 673 | 680 | 753 | 955 | 410 | 550 |
| 300° F | 2349 | 791 | 31 | 1731 | 1287 | 2620 | 2380 | 2203 | 1733 | 2067 | 2108 | 1953 |

The foregoing data demonstrate that compositions prepared according to the invention comprising polyglycidyl amino phenol epoxy resin can be modified by incorporating therein other epoxy resins and other auxiliary film-forming polymers and subsequently cured at room temperature using mixed anhydride curing systems comprising biphenyl anhydride to afford cured resin systems having useful high temperature properties. The data show that some experimentation may be necessary to obtain optimal formulations.

EXAMPLE VII

Several compositions are prepared according to the formulations of Table VII. In each instance, the biphenyl anhydride and maleic anhydride are ground to a fine powder and sequentially blended with stirring. After solubilization of the anhydride curing agents in the epoxy system, aluminum parts are bonded and tested for tensile lap shear according to the procedure of Example V. The formulations and results are reported in Table VII.

TABLE VII

| COMPOSITION | A | B | C | D | E |
|---|---|---|---|---|---|
| Ingredients | | | | | |
| Triglycidyl p-aminophenol | 100 | 100 | 100 | 100 | 100 |
| 3,3',4,4'-Benzophenone tetracarboxylic dianhydride | 9.4 | 17.9 | 28 | 37.4 | 46.8 |
| Maleic anhydride | 14.0 | 28.1 | 42 | 56.1 | 70.3 |
| A/E ratio | 0.2 | 0.4 | 0.6 | 0.8 | 1.0 |
| Pot Life$^a$, hrs. | ~16 | ~16 | ~24 | ~24 | ~2 |
| Time to dissolve, hrs. | 0.5 | 0.5 | 1.0 | 1.0 | 1.75 |
| Tensile lap shear, psi | | | | | |
| Room temperature | 1160 | 767 | 890 | 1100 | 625 |
| 300° F | 76 | 868 | 1250 | 1500 | 1260 |

$a$ = Elapsed time from start of mixing to gel state.

EXAMPLE VIII

To 30 parts Epon 828 (Shell Chem. Corp.) bisphenol A/epichlorhydrin epoxy resin there is sequentially added with counter-rotational stirring 28 parts 3,3',4,4'-benzophenone tetracarboxylic dianhydride and 42 parts maleic anhydride. The resulting dispersion is blended with stirring into 70 parts triglycidyl p-aminophenol epoxy resin. The mixed anhydride system is substantially completely dissolved in the mixed epoxy resin system. The composition is used to bond sandblasted, solvent-degreased, etched aluminum parts. The bonded assemblies are cured at room temperature for 24 hours and tested for tensile lap shear (ASTM D-1002-64) at room temperature (RT) and 300° F. The results are as follows:

| Test Temperature | Tensile Lap Shear, psi |
|---|---|
| Room Temperature | 1073 |
| 300° F | 1958 |

The data demonstrate an alternate method for preparing the compositions of the invention, and the use of the resulting compositions to obtain a cured system having useful high temperature properties

EXAMPLE IX

Epoxy resin compositions are prepared according to the procedure of Example III as follows:

| COMPOSITION | A | B |
|---|---|---|
| Ingredients | | |
| Triglycidyl p-aminophenol | 100 | 100 |
| 3,3',4,4'-Benzophenone tetracarboxylic dianhydride | 28 | 28 |
| Maleic anhydride | 42 | 42 |
| Water | 0 | 0.6 |

Composition A requires 29 hours to cure to a hard glassy state. Composition B requires less than 24 hours to obtain a degree of cure equivalent to that of Composition A after 29 hours. The data demonstrate the accelerating effect of water on cure rate.

What is claimed is:

1. A room temperature stable two-pack epoxy resin system consisting essentially of
   a. a first pack comprising at least one polyglycidyl aminophenol having the structure

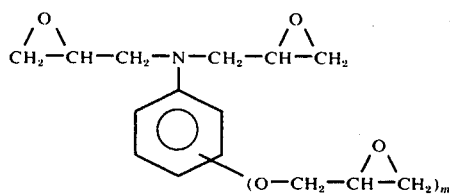

wherein m is 1 or 2; and
   b. a second pack comprising at least one biphenyl anhydride having the structure

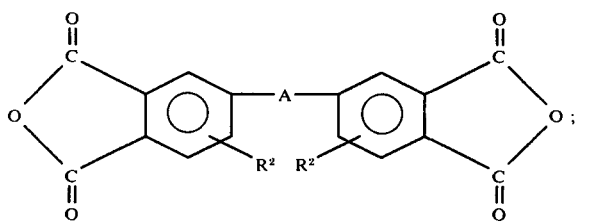

wherein A is selected from the group consisting of

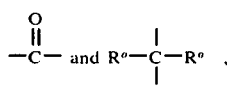

wherein each R⁰ is individually a monovalent radical selected from the group consisting of hydrogen, halogen, hydroxy, alkyl radical having from 1 to 5 carbon atoms, alkoxy radical having from 1 to 5 carbon atoms and

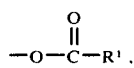

wherein R¹ is an alkyl radical having from 1 to 5 carbon atoms; and wherein each R² is individually a monovalent radical selected from the group consisting of hydrogen, halogen, alkyl radical having from 1 to 5 carbon atoms, —NO₂, —COOH, —SO₃H, and —NH₂.

2. An epoxy resin system according to claim 1 wherein the overall ratio of anhydride equivalents to epoxide equivalents is in the range of 0.2 – 1.3:1.

3. An epoxy resin system according to claim 2 wherein said second pack has incorporated therein at least one other carboxylic anhydride epoxy curing agent, said other anhydride is not a biphenyl anhydride; of the structure of claim 1 and wherein at least about 40 percent of the total anhydride equivalents is provided by said biphenyl anhydride.

4. An epoxy resin system according to claim 1 wherein A is

5. An epoxy resin system according to claim 2 wherein A is

6. An epoxy resin system according to claim 5 wherein said anhydride: epoxy ratio of equivalents is in the range of 0.55 – 1.1:1.

7. An epoxy resin system according to claim 6 wherein m is 1.

8. An epoxy resin system according to claim 7 wherein said polyglycidyl aminophenol is triglycidyl p-aminophenol, said biphenyl anhydride is 3,3',4,4'-benzophenone tetacarboxylic dianhydride, and the ratio of anhydride equivalents to epoxide equivalents is in the range of 0.6–0.95:1.

9. An epoxy resin system according to claim 3 wherein said other anhydride is maleic anhydride.

10. An epoxy resin system according to claim 9 wherein A is

11. An epoxy resin system according to claim 9 wherein said polyglycidyl aminophenol is triglycidyl p-aminophenol, said biphenyl anhydride is 3,3',4,4'-benzophenone tetracarboxylic dianhydride, and the overall ratio of anhydride equivalents to epoxide equivanents is in the range of 0.6–0.95:1.

12. An epoxy resin system according to claim 2 wherein said first pack has incorporated therein at least one other epoxy resin, said other epoxy resin is not a polyglycidyl aminophenol; and wherein at least about 50 percent of said epoxide equivalents is provided by said polyglydicyl aminophenol.

13. An epoxy resin system according to claim 12 wherein A is

14. An epoxy resin system according to claim 13 wherein said polyglycidyl aminophenol is triglycidyl p-aminophenol; said biphenyl anhydride is 3,3',4,4'-benzophenone tetracarboxylic dianhydride; said other epoxy resin is selected from the group consisting of epoxypolyethers, polyepoxypolyhydroxypolyethers and epoxy novolaks; and the overall ratio of anhydride equivalents to epoxide equivalents is in the range of 0.6 – 0.95:1.

15. An epoxy resin system according to claim 3 wherein said first pack has incorporated therein at least one other epoxy resin, said other epoxy resin is not a polyglycidyl aminophenol; and wherein at least about 50 percent of said epoxide equivalents is provided by said polyglycidyl amino phenol.

16. An epoxy resin system according to claim 15 wherein A is

17. An epoxy resin system according to claim 16 wherein said polyglycidyl aminophenol is triglycidyl p-aminophenol; said biphenyl anhydride is 3,3',4,4'-benzophenone tetracarboxylic dianhydride; said other epoxy resin is selected from the group consisting of epoxypolyethers, polyepoxypolyhydroxypolyethers, and epoxy novolaks; said other anhydride is maleic anhydride; and the overall ratio of anhydride equivalents to epoxide equivalents is in the range of 0.6 – 0.95:1.

18. An epoxy resin composition comprising the admixture of
  i. at least one polyglycidyl aminophenol epoxy resin having the structure

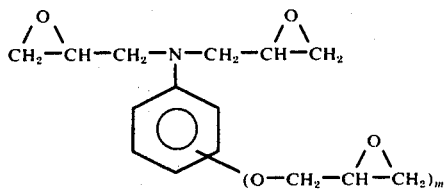

wherein $m$ is 1 or 2; and
  ii. at least one biphenyl anhydride having the structure

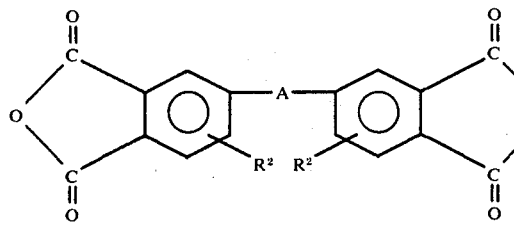

wherein A is selected from the group consisting of

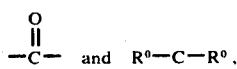

wherein each R is individually a monovalent radical selected from the group consisting of hydrogen, halogen, hydroxy, alkyl radical having from 1 to 5 carbon atoms, alkoxy radical having from p to 5 carbon atoms, and

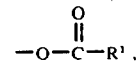

wherein R is an alkyl radical having from 1 to 5 carbon atoms; and
wherein each R is individually a monovalent radical selected from the group consisting of hydrogen, halogen, alkyl radical having 1 to 5 carbon atoms, $-NO_2$ $-COOH$, $-SO_3H$, and $-NH_2$;
said composition having a ratio of anhydride equivalents to epoxide equivalents in the range of 0.2 – 1.3:1;
said composition being adapted to cure at room temperature.

19. An epoxy resin composition according to claim 18 wherein A is

20. An epoxy resin composition according to claim 18 wherein said polyglycidyl aminophenol is triglycidyl p-aminophenol.

21. An epoxy resin composition according to claim 20 wherein said biphenyl anhydride is 3,3',4,4'-benzophenone tetracarboxylic dianhydride.

22. An epoxy resin composition according to claim 18 having incorporated therein at least one other and different epoxy resin, wherein at least 50 percent of the total epoxide equivalents is provided by said polyglycidyl aminophenol.

23. An epoxy resin composition according to claim 22 wherein A is

24. An epoxy resin composition according to claim 23 wherein said other and different epoxy resin is selected from the group consisting of epoxypolyethers, polyepoxypolyhdroxypolyethers and epoxy novolaks.

25. An epoxy resin composition according to claim 24 wherein said polyglycidyl aminophenol is triglycidyl p-aminophenol.

26. An epoxy resin composition according to claim 25 wherein said biphenyl anhydride is 3,3',4,4'-benzophenone tetracarboxylic dianhydride and said ratio of anhydride equivalents to epoxide equivalents is in the range of 0.6–0.95:1.

27. An epoxy resin composition according to claim 18 having incorporated therein at least one other and different carboxylic anhydride, and wherein at least 40 percent of the total anhydride equivalents is provided by said biphenyl anhydride.

28. An epoxy resin composition according to claim 27 wherein A is

29. An epoxy resin composition according to claim 28 wherein said other and different anhydride is maleic anhydride.

30. An epoxy resin composition according to claim 29 wherein said polyglycidyl aminophenol is triglycidyl p-aminophenol.

31. An epoxy resin composition according to claim 30 wherein said biphenyl anhydride is 3,3',4,4'-benzophenone tetracarboxylic dianhydride and said ratio of anhydride equivalents to epoxide equivalents is in the range of 0.6 − 0.95:1.

32. An epoxy resin composition according to claim 22 having incorporated therein at least one other and different carboxylic anhydride, and wherein at least 40 percent of the total anhydride equivalents is provided by said biphenyl anhydride.

33. An epoxy resin composition according to claim 32 wherein A is

34. An epoxy resin composition according to claim 33 wherein said other and different anhydride is maleic anhydride.

35. An epoxy composition according to claim 33 wherein said other and different epoxy resin is selected from the group consisting of epoxypolyethers, polyepoxypolyhydroxypolyethers and epoxy novolaks.

36. An epoxy resin composition according to claim 35 wherein said other and different anhydride is maleic anhydride.

37. An epoxy resin composition according to claim 35 wherein said polyglycidyl aminophenol is triglycidyl p-aminophenol.

38. An epoxy resin composition according to claim 37 wherein said other and different anhydride is maleic anhydride.

39. An epoxy composition according to claim 37 wherein said biphenyl anhydride is 3,3',4,4'-benzophenone tetracarboxylic dianhydride and said ratio of anhydride equivalents to epoxide equivalents is in the range of 0.6 − 0.95:1.

40. An epoxy resin composition according to claim 39 wherein said other and different anhydride is maleic anhydride.

* * * * *